(12) United States Patent
Smith et al.

(10) Patent No.: US 7,825,776 B2
(45) Date of Patent: Nov. 2, 2010

(54) DEVICE CONFIGURATION WITH RFID

(75) Inventors: Joshua R. Smith, Seattle, WA (US); Dirk Haehnel, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/506,563

(22) Filed: Aug. 17, 2006

(65) Prior Publication Data

US 2008/0041930 A1 Feb. 21, 2008

(51) Int. Cl.
*H04Q 5/22* (2006.01)
(52) U.S. Cl. ........................................ 340/10.51; 713/1
(58) Field of Classification Search .............. 340/10.51, 340/10.41, 572.1; 713/1, 100
See application file for complete search history.

(56) References Cited

U.S. PATENT DOCUMENTS

| | | | | |
|---|---|---|---|---|
| 6,177,860 B1 * | 1/2001 | Cromer et al. | ............. | 340/10.1 |
| 6,873,259 B2 * | 3/2005 | Teraura | ................... | 340/572.1 |
| 6,876,295 B1 * | 4/2005 | Lewis | ....................... | 340/10.1 |
| 7,183,924 B1 * | 2/2007 | Ku | ........................... | 340/572.1 |
| 2006/0279412 A1 * | 12/2006 | Holland et al. | .......... | 340/10.51 |

OTHER PUBLICATIONS

U.S. Appl. No. 11/239,362, filed Sep. 30, 2005—Radio Frequency Identificaiton Tag.

* cited by examiner

*Primary Examiner*—Thomas J Mullen
(74) *Attorney, Agent, or Firm*—Schwegman, Lundberg & Woessner, P.A.

(57) ABSTRACT

Various embodiments of the invention may use a radio frequency identification (RFID) tag with a writable non-volatile storage element to receive and store configuration parameters for a device connected to the RFID tag, even if the device itself is powered off. Upon power-up and startup of the device, the device may read the configuration parameters from the RFID tag and install them for its subsequent operation. Some embodiments may work in the opposite direction, by allowing the powered device to write its configuration data into the RFID tag's storage element, whose contents may subsequently be transmitted by the RFID tag to an RFID reader, even if the device is unpowered at the time of transmission.

15 Claims, 5 Drawing Sheets

DEVICE CONFIGURATION WITH RFID

BACKGROUND

When a company buys devices such as personal computers, laptops, etc. for use by its employees, those devices typically must be configured by the Information Technology department so that each device will be customized for the use of that company and/or by a particular employee. Such customization may include such things as setting IP addresses, wireless addresses, security keys, user ID, etc. To set these parameters, each device must be removed from its shipping carton, assembled, powered up, and operated to set the relevant parameters. In some cases, the device must also then be disassembled and re-packed into its shipping carton for delivery to its destination. The time and effort involved in this whole process can cost the company a great deal of money in labor costs, delays, etc.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

Figure 1:
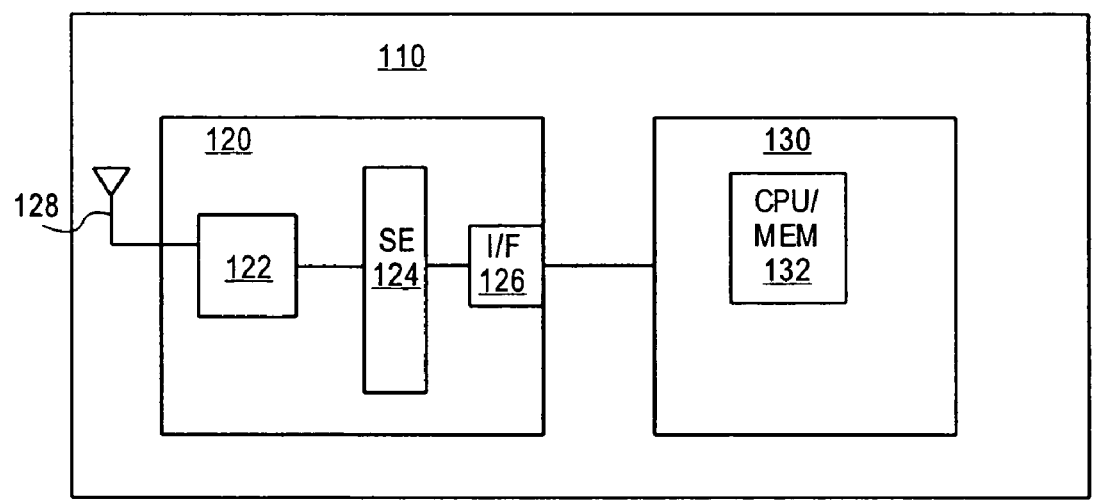
FIG. 1 shows a diagram of a device with an RFID tag that can store configuration parameters for the device.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements co-operate or interact with each other, but they may or may not be in direct physical or electrical contact.

The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

Within the context of this document, an RFID tag (sometimes referred to as an RFID transponder) may be defined as comprising an RFID antenna (to receive an incoming wireless signal that serves to activate the RFID tag, and to transmit a wireless response in the form of a modulated radio frequency signal), and an RFID tag circuit (which may include circuitry to store an identification code for the RFID tag, circuitry to transmit that code through the antenna, and in some embodiments a power circuit to collect received energy from the incoming radio frequency signal and use some of that energy to power the operations of the RFID tag circuit). The RFID tag circuit and/or the RFID antenna may be in a standalone package, or may be incorporated in a package with other circuitry (e.g., on a printed circuit board or in a semiconductor die containing other circuitry). As is known in the field of RFID technology, "transmitting" a signal from an RFID tag may include either: 1) providing sufficient power to the antenna to generate a signal that radiates out from the antenna, or 2) reflecting a modulated version of the received signal. Within the context of this document, an RFID reader may be a device that wirelessly transmits a signal to the RFID tag to cause the RFID tag to wirelessly transmit the aforementioned response which may then be received by the RFID reader to identify the RFID tag.

As used in the claims, unless otherwise specified the use of the ordinal adjectives "first", "second", "third", etc., to describe a common object, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a machine-readable medium, which may be read and executed by one or more processors to enable performance of the operations described herein. A machine-readable medium may include any mechanism for storing, transmitting, and/or receiving information in a form readable by a machine (e.g., a computer). For example, a machine-readable medium may include a storage medium, such as but not limited to read only memory (ROM); random access memory (RAM); magnetic disk storage media; optical storage media; a flash memory device, etc.

Various embodiments of the invention may use a radio frequency identification (RFID) tag to wirelessly receive configuration parameters for another device and store those parameters in a non-volatile storage element, even if the device is powered off and even if the device is still in its shipping carton at the time. At a later time, when the device is powered up, the device may read those parameters from the non-volatile storage element and use those parameters to configure itself. In a similar manner, an RFID reader may be used to read the stored parameters from the non-volatile storage element (by interrogating the RFID tag) as a way of verifying the parameters were stored correctly, or alternately as a way of determining what parameters are currently being used by the device.

FIG. 1 shows a diagram of a device with an RFID tag that can store configuration parameters for the device. In the illustrated embodiment, device 110 may contain an RFID tag 120 and computer logic 130. (Note: various descriptions in this document may refer to the RFID tag 120 as being part of device 110, to indicate that the RFID tag is physically a part of the device. Other descriptions may refer to device 110 and RFID tag 120 as separate entities, to indicate that they are functionally separate for operational purposes. This distinction is not contradictory, and should not be interpreted to limit how the RFID tag is integrated into the device.) For example, device 110 may comprise a computer system of some type, such as but not limited to a server, a personal computer, a notebook computer, a personal data assistant, a cellular telephone, etc. Device 110 may or may not have other wireless communications capability (not shown) in addition to that provided by the RFID tag 120. Computer logic 130 may comprise a processor/memory combination 132, which can configure various aspects of its operation by obtaining and storing the correct configuration data in specified internal storage locations. RFID tag 120 may comprise an antenna 128, RFID tag logic 122, a writable non-volatile storage element 124, and an interface 126 through which CPU/memory 132 may transfer the configuration data between itself and the non-volatile storage element 124. In various embodiments, this transfer may comprise writing to the storage element, reading from the storage element, or both.

With the system shown in FIG. 1, configuration data may be wirelessly received by RFID tag 120 through its antenna 128 and written into storage element 124. In a passive RFID tag, this operation may be performed using only the electrical energy harvested from a radio-frequency (RF) signal received through the antenna 128, and storage element 124 may be a non-volatile storage element so that when the RF signal stops, the stored data will remain intact in storage element 124. In an active RFID tag, power to operate this tag may be provided by a local power source (e.g., a battery), and either a volatile or non-volatile storage element 124 might be used.

At a later time, when computer logic 130 is powered up, computer logic 130 may read the configuration data from storage element 124 through wired interface 126 ("wired" indicating that the data is transferred over physical electrical and/or electronic paths, rather than with radio signals), and use that data to configure the operations of device 110. In some embodiments, the configuration data read from storage element 124 may then be stored in other memory areas (not shown) of device 110, such as but not limited to non-volatile memory (e.g., flash memory, magnetic disk, etc.), so that such data will still be available when it is needed in future operations of device 110. In other embodiments, some or all of the configuration data may be re-read from storage element 124 every time device 110 goes through a startup process (such as a power-up, a reboot, a restart, etc.). Some embodiments may combine both techniques, storing the configuration data in non-volatile memory areas, but still re-reading the configuration data from storage element 126 upon the occurrence of particular events.

In other embodiments, configuration data that is being used by device 110 may be written into storage element 124 by computer logic 130 while computer logic 130 is powered up. At a later time, the RFID tag may read that configuration data from storage element 124 and wirelessly transmit that configuration data through antenna 128 in response to a query from an RFID reader, even if computer logic 130 is unpowered at the time.

Through the mechanisms just described, new configuration data may be wirelessly transmitted to a programmable device for its subsequent use, even if the device is unpowered at the time, and/or existing configuration data may be wirelessly transmitted from the programmable device, even if the device is unpowered at the time. These capabilities may permit the wireless modification and/or identification of configuration parameters for a device, even if the device that uses the configuration parameters is unpowered (and maybe even in a shipping container) at the time of the wireless exchange of information.

In some embodiments, since interface 126 may only be used when communicating with CPU/memory 132, interface 126 may receive operating power from the same power source that powers CPU/memory 132, and remain unpowered when CPU/memory 132 is unpowered. In some embodiments, storage element 124 may receive operating power from the same source as CPU/memory 132 when CPU/memory 132 is powered, and may receive operating power from the same source as RFID tag 120 when RFID tag 120 is powered.

Figure 2:
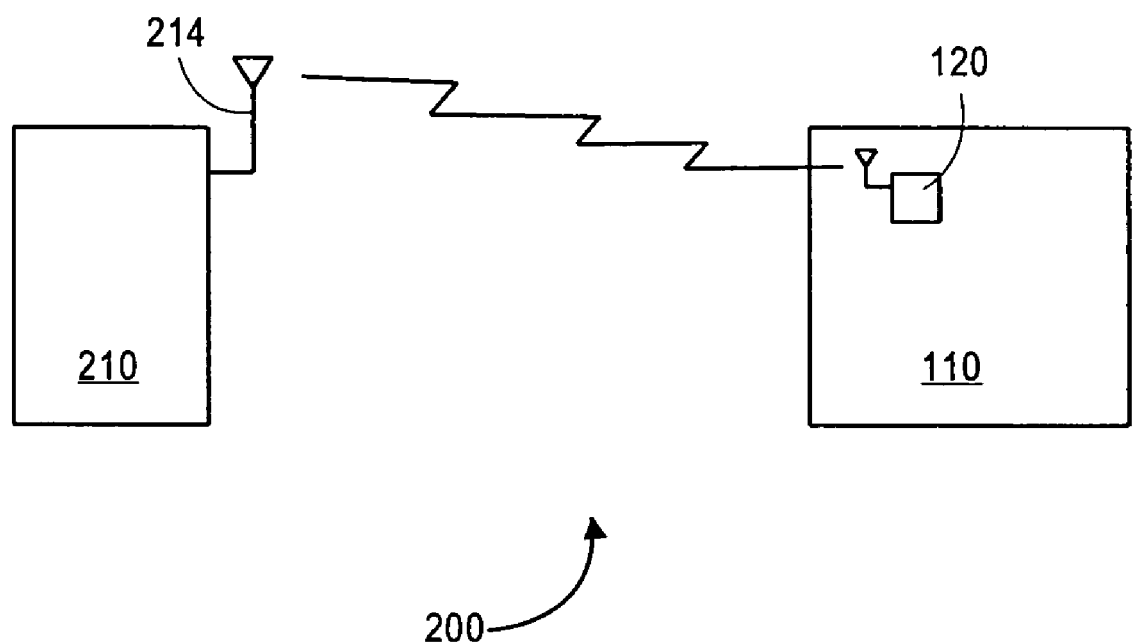
FIG. 2 shows a communications system with a device containing an RFID tag, according to an embodiment of the invention.

FIG. 2 shows a communications system with a device containing an RFID tag, according to an embodiment of the invention. In the illustrated system 200, device 110 may contain an RFID tag 120, as previously shown in FIG. 1. In various embodiments, RFID tag 120 may be physically enclosed within device 110, may be physically external to device 110, or may be partly enclosed within and partly external to device 110 (e.g., the RFID tag antenna might be external to the enclosure of device 110, while the RFID tag circuit might be internal to the enclosure). Regardless of the tag's physical placement and/or physical configuration, an RFID reader 210 may communicate with RFID tag 120 by transmitting wireless signals to RFID tag 120 through antenna 214, and by receiving wireless signals from RFID tag 120 through antenna 214. RFID reader 210 and RFID tag 120 may use any feasible RFID technology for such communications. In some embodiments, RFID reader 210 may communicate with multiple such RFID tags in a single communications session, but other embodiments may limit communications to a single RFID tag per communications session.

The configuration data communicated from RFID reader 210 to RFID tag 120 may be any feasible configuration data for use by the device 110, such as but not limited to: a media access control (MAC) address, a key for encrypting and/or decrypting data, a user identifier, a privilege level, a desired software or firmware revision level, etc. Depending on the desired security levels, such data may or may not be encrypted before transmission. In some embodiments, the RFID reader may also read the configuration data stored in the RFID tag by transmitting a wireless query to the RFID tag asking for that information, and wirelessly receiving that information in a response from the RFID tag. Such an exchange may be used for various purposes, such as but not limited to: 1) verifying the transmitted configuration data was correctly received and stored by the RFID tag, 2) determining what configuration data is currently being used by the device, 3) etc. In some embodiments, the device 110 may write data into storage element 124 (even data that was not previously communicated from the RFID reader 210 to the RFID tag 120), and this data may subsequently be transmitted from the RFID tag to the RFID reader in response to a query from the RFID reader. Regardless of the direction in which the configuration data flows, this data may be any of various types of configuration data, such as but not limited to hardware identification numbers, software revision levels, firmware revision levels, etc. Some examples of firmware-related configuration data might be Basic Input Output System (BIOS) or Extended Flash Interface (EFI) revision levels. In some embodiments this data may include a validation value (such as a label, checksum, digital signature, etc.) rather than the actual information, so that the correct configuration may be verified without having to transfer the actual configuration information itself.

Figure 3:
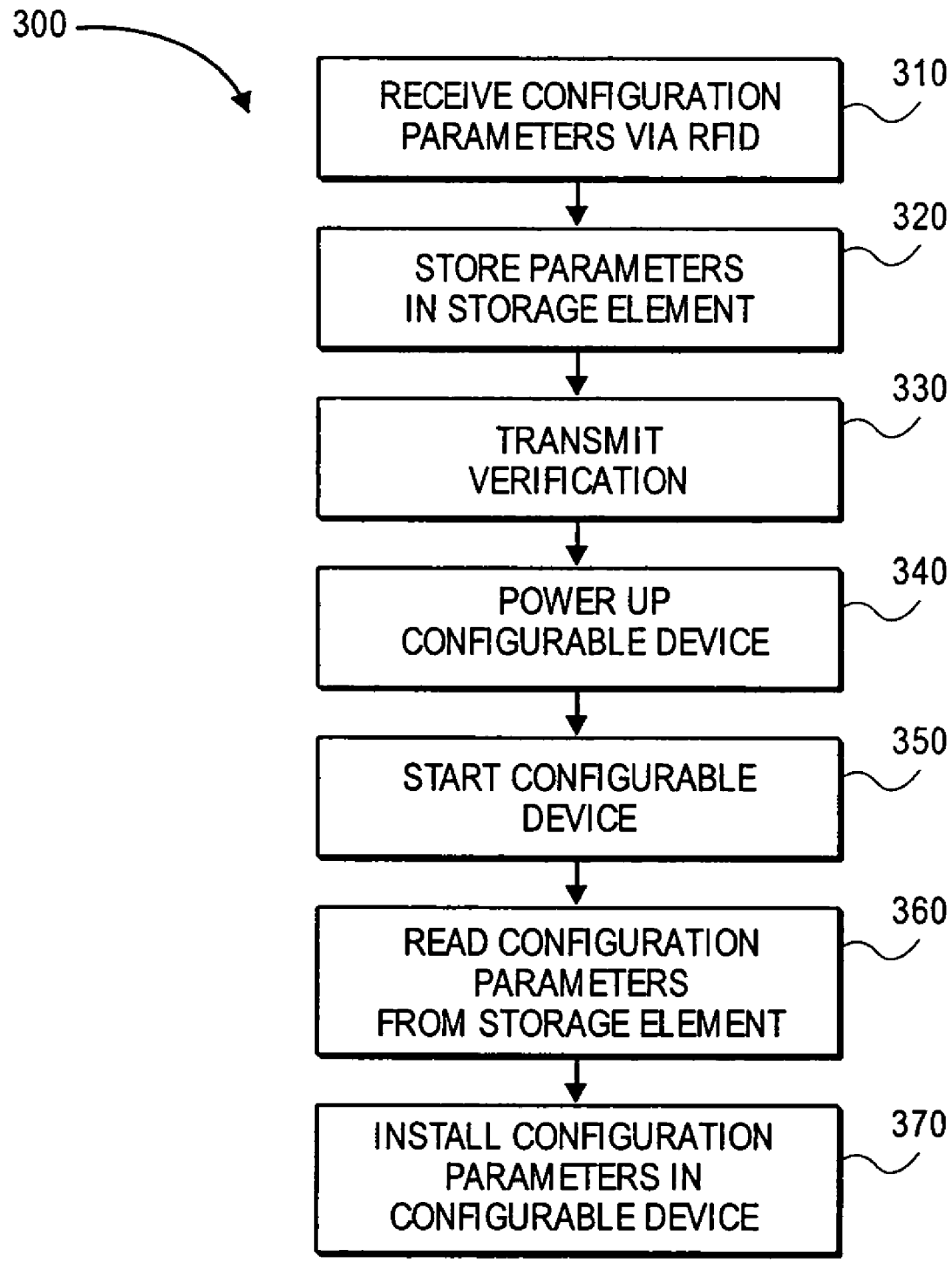
FIG. 3 shows a flow diagram of a method, according to an embodiment of the invention.

FIG. 3 shows a flow diagram of a method, according to an embodiment of the invention. Although a discrete number of particular operations are shown in flow diagram 300 and other flow diagrams in this document, some embodiments of the invention may use fewer, more, and/or different operations than those shown. In the illustrated embodiment, operations 310-330 may be performed by an RFID tag, while operations 340-370 may be performed by a device (such as a computer system) that is using the RFID tag to convey configuration parameters for the device.

At 310 an RFID tag may receive a data transmission from an RFID reader, with the content of the data transmission containing one or more configuration parameters. In some embodiments the data transmission may contain other information as well. At 320, the RFID tag may store the parameters in a storage element, which in some embodiments may be a non-volatile storage element such as flash memory cells. In some embodiments the storage element may be part of the RFID tag circuitry and the write operation may be powered by the electrical energy that was harvested from the wireless RF signal received by the RFID tag. Even though the received RF signal may stop shortly thereafter, leaving the tag without operational power, the data stored in the storage element may remain intact.

In some embodiments, various security techniques may be used to make tampering more difficult, i.e., to make it more difficult for unauthorized persons to put unauthorized configuration parameters into the storage element. Such techniques may include things such as, for example, encryption of the configuration parameters.

At 330 the RFID tag may transmit a verification to the RFID reader that the configuration information was received and stored correctly. This verification may follow any of various processes. In one embodiment, the current communications sequence between the RFID reader and the RFID tag may contain a verification response. In another embodiment, a subsequent, separate communication between the RFID reader and RFID tag may include the verification response. Such verifications may include a checksum, ECC, or other data integrity check, and/or may include an Acknowledgment sequence. In still another embodiment, the RFID reader may request the RFID tag to transmit the contents of its storage element, and the RFID reader may compare those contents with the expected values to determine if they are correct.

Operations 310-330 may be performed by an RFID tag that is part of a larger device (e.g., the RFID tag may be on a circuit board in a larger computer system). In some instances, the larger device might be unpowered, and might even still be partially disassembled and/or in a shipping carton. At a later time, when the device is assembled and ready for operation, it may be powered up at 340 and started at 350. As a part of the startup sequence, at 360 the device may read the configuration parameters from the storage element in the RFID tag, and then install those configuration parameters in the proper locations at 370 so that those configuration parameters will determine the operational configuration of the device. The 'proper locations' may be whatever locations the particular parameters are normally placed in, for example in a configuration table, in a BIOS, in disk locations, etc.

Although the previous text described transmitting the configuration parameters to the RFID tag while the associated device was unpowered and possibly in a shipping carton, in some embodiments the configuration parameters may also be updated while the associated device is powered up and/or operating. The new parameters may then be installed upon initiation of a particular event (e.g., a restart operation or receipt of a particular command).

Figure 4:
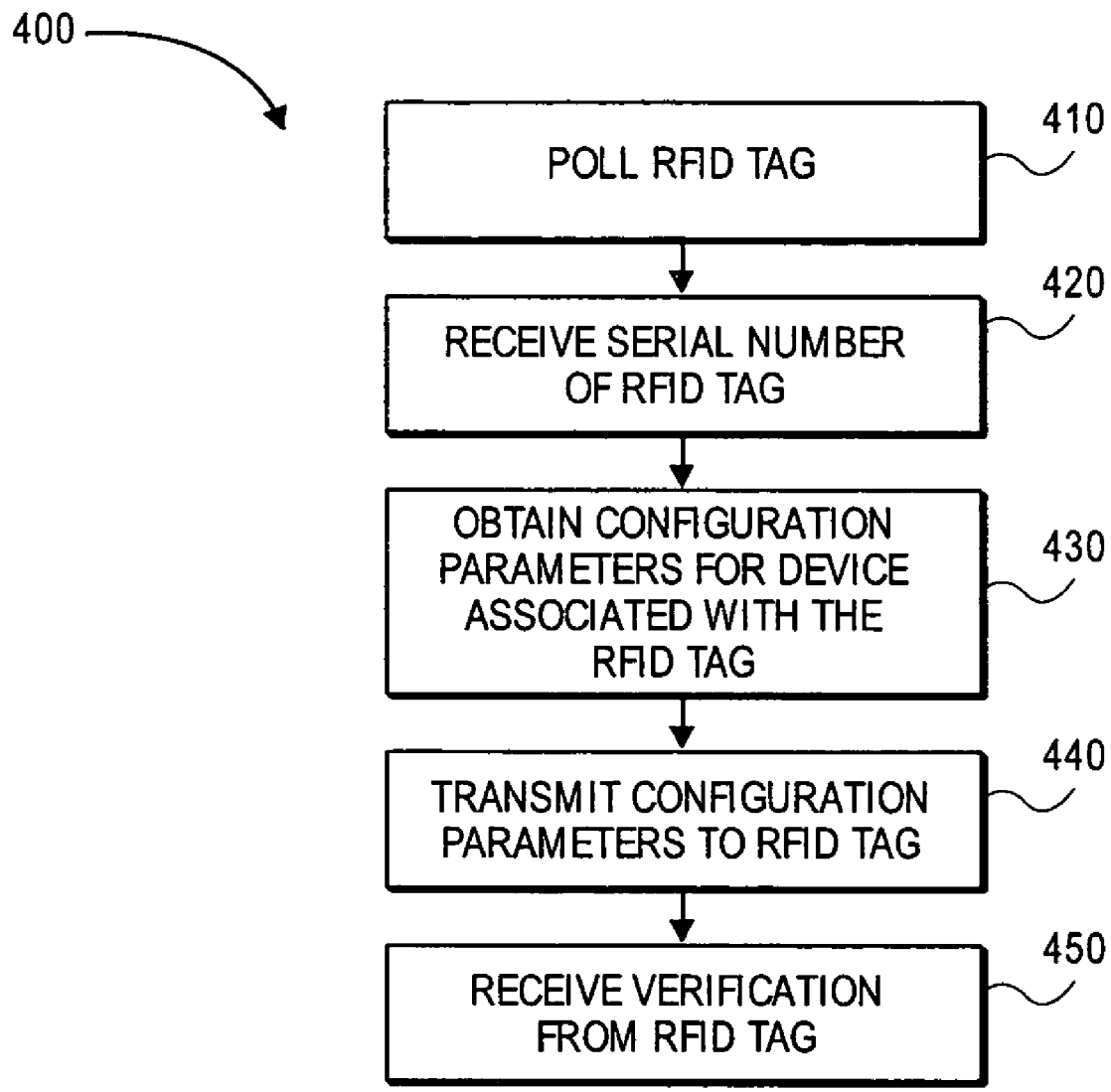
FIG. 4 shows a flow diagram of a method performed by an RFID reader, according to an embodiment of the invention.

FIG. 4 shows a flow diagram of a method performed by an RFID reader, according to an embodiment of the invention. In flow diagram 400, at 410 the RFID reader may send a poll to an RFID tag. The poll may take any of various forms that are used in RFID technology to prompt a response from the RFID tag. The response of the RFID tag, including a serial number or other identification number of the RFID tag, may be received at 420. Based on this serial number, at 430 the RFID reader may then obtain configuration parameters for a device that has already been associated with that particular RFID tag. For example, at the time of manufacture that particular RFID tag may have been attached to that particular device, and a record of their resulting association may have been created. At the time of operation 430, the RFID reader may already have a record of the correct configuration parameters, but in other instances the RFID reader may have to communicate with another device (e.g., a remote database server) to get that information.

Once the correct parameters have been obtained, those parameters may be transmitted to the RFID tag at 440 for storage in that RFID tag. In some embodiments, the RFID reader will need verification that the RFID tag correctly received and stored the correct parameters, and that verification may be received at 450. This verification may be handled in various ways. For example, in some embodiments the RFID tag may send a verification as a part of the process of receiving the parameters and storing the parameters. But in other embodiments the RFID reader may have to subsequently poll the RFID tag and specifically request the contents of the RFID tag's storage element. Other embodiments may use still other techniques.

Figure 5:
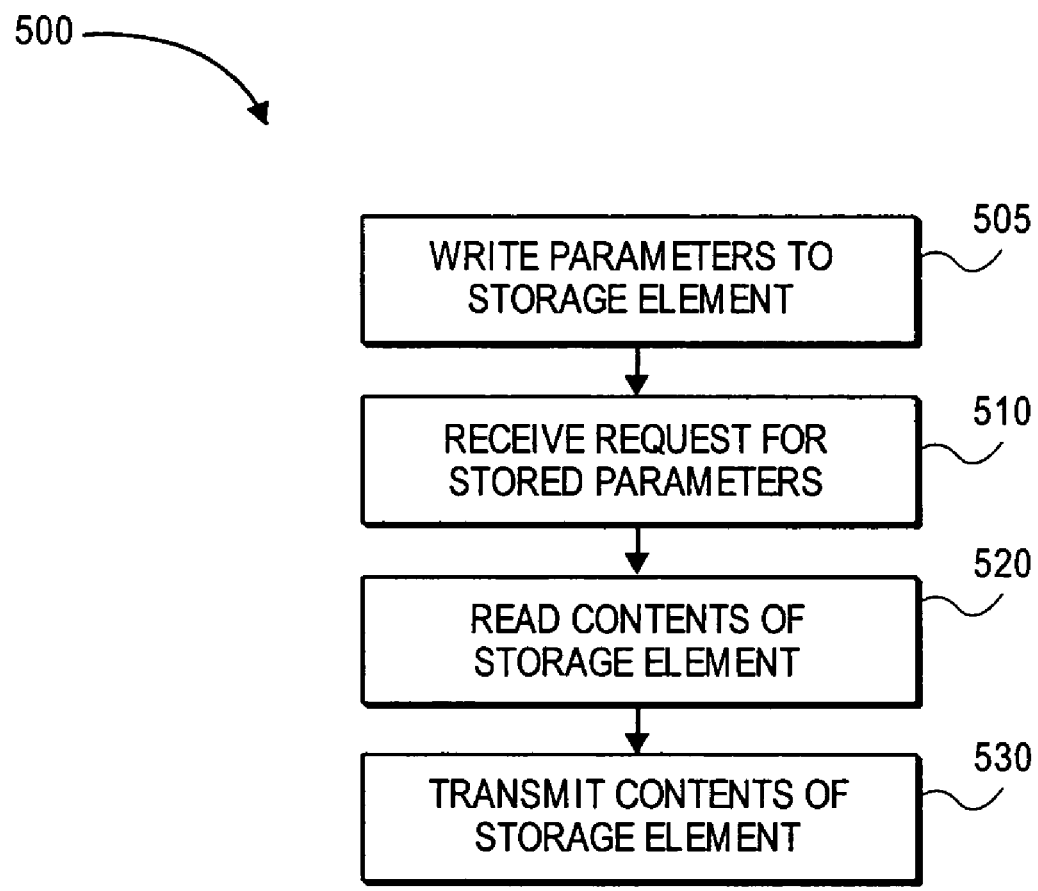
FIG. 5 shows a flow diagram of a method of providing the stored configuration parameters from an RFID tag to an RFID reader, according to an embodiment of the invention.

FIG. 5 shows a flow diagram of a method of providing the stored configuration parameters from an RFID tag to an RFID reader, according to an embodiment of the invention. In flow diagram 500, at 505 the computer logic may write some or all of its configuration parameters into the non-volatile storage element of an attached RFID tag. At a later time (possibly even after the computer logic has been powered off), at 510 the RFID tag may receive a transmission from an RFID reader, requesting the RFID tag to respond with some or all of the contents of the RFID tag's storage element. At 520, the RFID tag may read the contents of its storage element, and at 530 it may transmit those contents to the RFID reader. This exchange may take place for any feasible reason, such as but not limited to verifying that the parameters transmitted to the RFID tag were correctly received and stored (which might eliminate the need for step 505), or learning the current configuration of a device when the RFID reader has no current or reliable knowledge of that configuration. In some embodiments, the device may write its new configuration data to the RFID tag's storage element whenever that configuration data changes (e.g., when a new software version is installed), so that the configuration may be wirelessly read by an RFID reader at a future time, even if the device itself is powered off at the time.

The foregoing description is intended to be illustrative and not limiting. Variations will occur to those of skill in the art. Those variations are intended to be included in the various embodiments of the invention, which are limited only by the spirit and scope of the following claims.

What is claimed is:

1. An apparatus, comprising:

a device that is programmable with configuration data for the device;

a radio frequency identification (RFID) tag containing a writable non-volatile storage element to store the configuration data;

a non-wireless interface coupled between the device and the non-volatile storage element to transfer the configuration data between the device and the non-volatile storage element; and wherein the device is to write the configuration data to the non-volatile storage element through the interface.

2. The apparatus of claim 1, wherein the device is to read the configuration data from the non-volatile storage element through the interface.

3. The apparatus of claim 1, wherein the RFID tag comprises a passive RFID tag.

4. The apparatus of claim 1, wherein the RFID tag is to wirelessly receive the configuration data from an RFID reader and is to write the received configuration data into the non-volatile storage element.

5. The apparatus of claim 1, wherein the RFID tag is to read the configuration data from the non-volatile storage element and wirelessly transmit the configuration data to an RFID reader.

6. The apparatus of claim 1, wherein the device is a device selected from a list consisting of:

a server computer;

a personal computer;

a laptop computer;

a personal data assistant; and a cellular telephone.

7. The apparatus of claim 1, wherein:

the device is to read the configuration data from the non-volatile storage element during a startup process of the device; and the device is to program its configuration with the configuration data.

8. A method comprising transferring, through a non-wireless interface, configuration data between computer logic and a non-volatile storage element of a radio frequency identification (RFID) tag, wherein said transferring comprises writing the configuration data from the computer logic to the non-volatile storage element.

9. The method of claim 8, wherein said transferring comprises reading the configuration data from the non-volatile storage element by the computer logic.

10. The method of claim 9, further comprising using the configuration data to configure a computer system containing the computer logic.

11. The method of claim 10, wherein said transferring and said using occur as part of a start-up process in the computer system.

12. The method of claim 8, further comprising wirelessly transmitting the configuration data from the RFID tag to an RFID reader, subsequent to said writing.

13. The method of claim 12, wherein said transmitting occurs when the computer logic is powered off.

14. An article comprising a tangible machine-readable medium that contains instructions, which when executed by one or more processors result in performing operations comprising transferring configuration data between computer logic and a non-volatile storage element of a radio frequency identification (RFID) tag coupled to the computer logic, where the operation of transferring comprises writing the configuration data to the non-volatile storage element from the computer logic.

15. The article of claim 14, wherein the operation of transferring comprises reading the configuration data from the non-volatile storage element, and the operations further comprise an operation to configure a computer system with the configuration data subsequent to said reading.

* * * * *